United States Patent [19]
Gauthier et al.

[11] Patent Number: 5,837,401
[45] Date of Patent: Nov. 17, 1998

[54] ADDITIVES FOR LUBRICATING AGENTS USED IN THE LAMINATION OF LITHIUM SHEETS INTO THIN FILMS

[75] Inventors: Michel Gauthier, La Prairie; Patrick Bouchard, Fleurimont; Paul-Emile Guerin, Cap-De-La-Madeleine, all of Canada; Michel Armand, St-Martin D'Uriage, France

[73] Assignee: Hydro-Quebec, Montreal, Canada

[21] Appl. No.: 273,756

[22] Filed: Jul. 12, 1994

[51] Int. Cl.[6] .............................. H01M 4/02; H01M 6/00; B32B 15/04; B32B 15/08
[52] U.S. Cl. .................. 429/212; 429/192; 429/198; 429/137; 252/62.2; 428/335; 428/457; 29/623.5
[58] Field of Search ................ 252/62.2, 50, 51, 252/51.5 R, 56 R, 545, 54 S, 52 A; 429/192, 198, 137, 212; 428/68, 174, 320.2, 221, 409, 77, 98, 335, 457, 336, 458, 463, 470; 29/623.5; 508/459, 465, 476, 500, 501, 506, 508, 510, 556, 579

[56] References Cited

U.S. PATENT DOCUMENTS

| | | | |
|---|---|---|---|
| 3,945,930 | 3/1976 | Sugiyama et al. | 508/431 |
| 4,303,748 | 12/1981 | Armand et al. | 429/192 |
| 4,357,401 | 11/1982 | Andre et al. | 429/192 |
| 4,362,815 | 12/1982 | Hill et al. | 435/172.1 |
| 4,578,326 | 3/1986 | Armand et al. | 429/192 |
| 4,824,746 | 4/1989 | Belanger et al. | 429/218 |
| 4,908,283 | 3/1990 | Takahashi et al. | 429/192 |
| 4,911,995 | 3/1990 | Belanger et al. | 429/183 |
| 4,925,752 | 5/1990 | Fauteux et al. | 429/192 |
| 5,160,369 | 11/1992 | Parkinson et al. | 106/19 R |
| 5,443,601 | 8/1995 | Doeff et al. | 29/623.5 |
| 5,453,335 | 9/1995 | Fauteux et al. | 252/62.2 |

FOREIGN PATENT DOCUMENTS 2068290  11/1993  Canada .

*Primary Examiner*—Alan Diamond
*Attorney, Agent, or Firm*—Oblon, Spivak, McClelland, Maier & Neustadt, P.C.

[57] ABSTRACT

Additives are represented by the following general formula:

$$L-Y-S$$

in which L designates a hydrocarbon radical which serves as lubricating segment; S designates an oligomer segment which serves as solvating segment of metallic salts and Y designates a chemical bond which joins the hydrocarbon radical and the oligomer segment. With these additives there is no more need to subsequently wash the surface of laminated lithium.

2 Claims, 1 Drawing Sheet

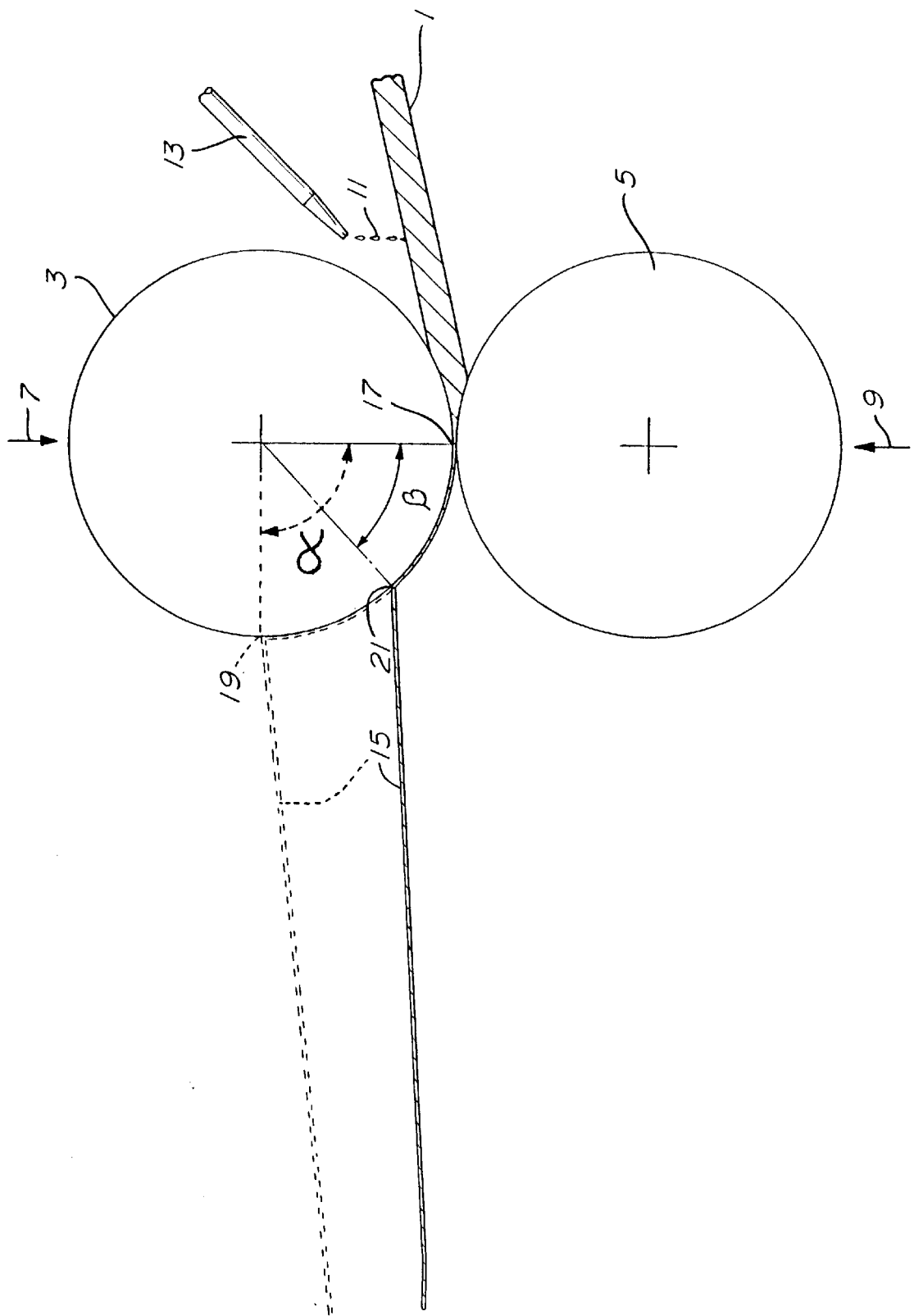

ADDITIVES FOR LUBRICATING AGENTS USED IN THE LAMINATION OF LITHIUM SHEETS INTO THIN FILMS

BACKGROUND OF INVENTION a) Field of the Invention

The invention concerns additives which may be used as lamination lubricating agents or are part of lamination lubricating agents. The invention also concerns compositions including these additives and which may be used in the lamination of a sheet such as lithium in order to obtain thin films, which may be used as such in the production of polymer electrolyte electrochemical cells. In addition, the invention concerns the use of the additives per se or compositions containing same to provide, by lamination, films of alkali metals or alloys thereof which may be used as anodes in electrochemical cells preferably with polymer electrolytes. The invention also concerns a process of lamination utilizing these additives or compositions containing same as lamination lubricating agents.

b) Description of Prior Art

The production of thin films of lithium having thicknesses lower that 75 micrometers and in the form of wide bands, for example 5 centimeters or more and in lengths of many tens of meters, by means of rapid and reliable processes, faces important technical difficulties which are attributable to the extreme physical and chemical properties of this metal: chemical reactivity, malleability, rapid self-welding by simple contact and strong adhesion on most solid materials, for example the usual metals.

This difficulty is confirmed by the difficulty of obtaining from suppliers of specialty metals and chemical products, thin lithium films 40 micrometers ($\mu$m) thick and less, of sufficient surface and length, having an adequate surface finish and chemical property to be used in lithium cells.

Presently, cold extrusion is used for the continuous production of sheets 75 $\mu$m and more. These thicknesses are generally adapted to the production of lithium cells utilizing liquid electrolytes. For lower thicknesses, the films obtained by extrusion are thereafter laminated between rollers made of hard materials. These processes have been described and are commercially used for the production of limited quantities of sheets of 30–75 microns. Reference will particularly be made to U.S. Pat. No. 3,721,113, inventor Hovsepian and dated Mar. 20, 1973. Many successive passes, according to the present state of the art, are required to give films 40–30 $\mu$m.

Other alternative processes have been described to give ultra-thin sheets, which are used for example in the production of polymer electrolyte cells in the form of thin films. This is the case for example of a lamination process between steel rollers which are protected by films of hard plastic which are non reactive towards lithium, such as described in U.S. Pat. No. 3,721,113, or of processes based on the coating of molten lithium on a metallic of plastic support, described in U.S. Pat. No. 4,824,746, inventors André Bélanger, et al, dated Apr. 25, 1989.

The difficulty in achieving the lamination of lithium to thicknesses which vary between 40 and 5 microns for the production of polymer electrolyte cells is mainly due to the reactivity and the adhesion of the laminated metal with the materials with which it is in contact: lamination rollers, protection plastic films, lamination additives, as well as to the bad mechanical properties of thin sheets. For example, a film of lithium 20 $\mu$m thick and 10 cm wide breaks under a drawing tension higher than 579.13 KPa which does not permit to pull on the film which exits from the laminating machine or to release it from the lamination rollers if lithium adheres somewhat thereto.

An approach which is normally used for the extensive lamination or calandering of hard metals, such as iron and nickel, is based on the use of liquid lamination additives consisting of organic solvents which may contain greases or lubricating agents. Examples include fatty acids or derivatives thereof such as for example lauric or stearic acids and alcohols, for example the compounds known under the trade marks EPAL 1012 of Ethyl Corporation U.S.A., which are mixtures of primary linear $C_{10}$—$C_{12}$ alcohols.

For lithium and particularly for lithium intended for electrochemical cells, the use of such additives involves two major difficulties:

1) the chemical reactivity of lithium which is in contact with solvents or lubricating agents including reactive organic functions, such as organic acids and alcohols. These functions react at the surface of lithium during and after lamination and create passivation films at the surface of the metal. This is harmful for a good operation of electrochemical cells especially when the latter are intended to be rechargeable;

2) the difficulty of removing the lubricating agents or greases which are in contact with lithium after lamination. This is the case, for example, when lubricating agents which mostly consist of hydrocarbon chains are selected, because they are nearly not reactive with lithium. These compounds constitute electrical insulating materials which are harmful to the good operation of lithium electrodes made with these sheets. Such lubricating agents are not very soluble in polymer electrolytes and should therefore be removed from the surface of lithium by washing after lamination. In addition to the fact that the washing of the surface of lithium is a delicate and costly operation, it will be noted that this operation inevitably contributes to contaminate the surface of lithium, in spite of all the care which may be used to control the quality of the surface of the metal. The latter reacts indeed irreversibly with all the impurities, including water, which are present in the washing solvents, or resulting from accidental contaminations.

It can be shown that the lithium obtained after a process of lamination with an additive followed by a subsequent washing is generally more contaminated at the surface than a lithium which is laminated without additive. This phenomenon may be observed with optical means, including a simple visual inspection or by a control of the impedance of the electrochemical batteries produced with polymer electrolytes. On the other hand, lamination without solvent and without lubricating agent means low production speeds and a tendency of the fresh lithium to stick to the rollers or the protection films of the rollers; moreover, many consecutive laminations are therefore required to reach thicknesses of the sheet lower than 40 micrometers.

SUMMARY OF INVENTION

It is an object of the present invention to solve the problem of lamination or calandering of lithium films, to thicknesses between 40 and 5 $\mu$m, which can be directly used in lithium batteries made with thin films, for example polymer electrolyte batteries.

It is also an object of the invention to propose lubricating additives which are chemically compatible with lithium and which may be used in a process of lamination which does not require a subsequent washing of the surface of laminated lithium.

Another object of the invention resides in a composition consisting of a lamination lubricating agent including an appropriate solvent as well as an additive having two functions.

Another object of the invention resides in an improvement of the process of lamination of lithium in the presence of an improved lubricating agent.

Another object of the invention is to propose lamination lubricating additives enabling to produce in a single pass, extremely thin lithium, for example a thickness lower than 10 $\mu$m, at appreciable speed which may be up to 50 m/min., and even more, and with an excellent control of the surface properties: uniform surface profile and low impedance of the passivation layer when the sheets thus produced are used in an electrochemical cell.

Another object of the invention consists in the provision of a lamination lubricating agent including an additive and solvents, in which the latter are selected for their chemical compatibility with a lithium which is intended for an electrochemical cell.

As used in the present description and in the appended claims, chemical compatibility of solvent or of an additive toward lithium of an electrochemical generator means the absence of chemical reaction with lithium or also, a limited chemical reaction leading to the formation of a passivation film which is not harmful to electrochemical exchanges, at the interface lithium/electrolyte of said cell.

Another object of the invention resides in the chemical formulation of a lubricating agent for use in lamination which is not volatile and is selected so that it may be kept at the surface of lithium after lamination and this without harming the good operation of the sheet of lithium (anode), when the latter is used as such in an electrochemical cell, i.e. without any previous washing step.

Another object of the invention resides in an improved process of lamination utilizing the additives according to the present invention.

The invention is based on the choice of a lubricating chemical compound of high molecular weight including at least two segments of different chemical nature: a chain or a chain segment having a lubricating function (L) as made, for example, of a hydrocarbon chain including at least 8 carbon atoms associated with a solvating chain (S), capable of ionically dissociating at least in part a metallic salt, for example of lithium, such as a chain segment of ethylene polyoxide. The solvating segment present in the lubricating additive is selected so as to confer an ionic conductivity to the lubricating additive.

A preferred but non limiting manner of inducing ionic conductivity in the lubricating additive is obtained when the laminated lithium is contacted with the electrolyte (solvating polymer+lithium salt) of the cell. The salt present in the electrolyte is then diffused in the solvating part of the additive and locally constitutes a complex conductor (solvating chain+salt).

The lubricating agent according to the invention comprises at least one sequence:

L-Y-S where:

L designates a hydrocarbon radical, such as alkyl, alkylene, linear or cyclic or aryl-alkyl, saturated or non saturated, preferably containing more than 8 carbon atoms used as a lubricating segment which is compatible with lithium;

S designates an oligomer segment including heteroatoms such as O or N, and capable of solvating salts, for example salts of lithium and ensuring an electrolytic conductivity;

Y designates a chemical bond or a chemical group which is at least divalent joining the chains or chain segments L and S.

The solvating cell segment S may be joined to a terminal group C to constitute the sequence L-Y-S-C, C then being selected for its low reactivity with lithium.

C may for example designate a group Y'-L', which is identical or different from group Y-L, an alkyl radical, an alkyl-aryl radical, of valence equal to or higher than 1. According to a variant, C is a polymerisable group which can be incorporated to at least one of the repetitive units which constitute the polymer electrolyte of an electrochemical cell. According to another variant, C includes a ionophoric group which is somewhat dissociable and is capable of inducing an intrinsic ionic conductivity in the additive.

Examples of polymeric solvating chains are given in the following patents: U.S. Pat. No. 4,303,748, inventors Michel Armand, et al, dated Dec. 1, 1981, and U.S. Pat. No. 4,578,326, inventors Michel Armand, et al, dated Mar. 25, 1986. Chains bases on ethylene oxide -[$CH_2$—$CH_2$—O]$_n$-, propylene oxide -[$CH_2$—$CH_2(CH_3)$—O]$_n$-or on poly-(N-methyl-ethyleneimine) -[$CH_2$—$CH_2$—$N(CH_3)$]$_n$ or their combinations are generally preferred, but other solvating functions may also be used as long as they may induce an ionic conductivity in the lubricating additive.

In the case where the hydrocarbon segment originates from a fatty acid, the bond Y preferably consists of ester (L)-CO-O-(S) or ether (L)-O-(S) groups. Y may also represent amine or amide groups.

According to a preferred embodiment of the invention, the segment may correspond to the hydrocarbon chain of a fatty acid including at least 8 and preferably from 10 to 30 carbon atoms. For example, L may consist of a hydrocarbon chain of a fatty acid such as stearic acid and Y may then be a chemical bond of the ester or ether type, or may represent a carboxylate group which originates from a fatty acid ester.

According to another preferred embodiment of the invention, the segment S may consist of polyethers or polyamines of molecular weights 150.

According to another preferred embodiment of the invention, the terminal group C may also include a chemical function capable of covalently fixing a metallic salt, for example a lithium salt.

According to another preferred embodiment of the invention, the chemical bond C may include a lithium salt which is chemically grafted by the anion or by means of one or more unsaturations.

The invention also resides in a lithium film covered with a thin layer of the additive defined above, the thickness of the film being between 5 and 50 microns.

Another aspect of the invention concerns a lithium based anode prepared from a sheet of lithium covered with a thin layer of the additive defined above, the thickness of the anode being between 5 and 50 $\mu$m, which is in direct contact with a sheet including carbon or metals capable of chemically forming an alloy of lithium or an intercalating compound of lithium.

The invention also concerns a polymer electrolyte electrochemical cell including a lithium anode which is prepared as indicated above, in which a free lithium salt is present in the electrolyte so as to form, by diffusion, a complex electrolyte conductor with the chain S of the additive, and the latter may be soluble in the electrolyte.

According to another embodiment of the invention, there is provided the use of an additive or a composition as defined above for producing films of alkali metals or alloys thereof by lamination, which may be used as anodes in polymer electrolyte electrochemical cells.

The invention finally concerns a process of lamination which is intended to give thin films of alkali metals or alloys thereof, from a sheet of said metals or alloys thereof wherein the sheet is passed between working rollers with a laminating lubricating agent to laminate the sheet into thin films, characterized in that the lubricating agent includes an additive or a composition as defined above.

A particularly interesting additive is a polyoxyethylene distearate whose solvating segment corresponds to a molecular weight between about 150 and 4000.

The compositions according to the invention preferably contain 0.01 to 10% by weight of additive, more specifically about 0.2%. With respect to the solvent, it may be selected among saturated or partially saturated linear, cyclic or aromatic hydrocarbons, for example heptane, benzene, toluene, cyclohexane or a mixture thereof. It may also be selected among aprotic solvents which are compatible with lithium.

A particularly advantageous formulation consists in using a family of compounds of the type: L-Y-S-Y-L based on diesters of fatty acids, for example polyether glycol stearates, such as the compounds, $CH_3$—$(CH_2)_{16}$—COO—$(CH_2$—$CH_2$—$O)_n$—OOC$(CH_2)_{16}$—$CH_3$ where n preferably varies between 3 and 100. Compounds including polyether segments of molecular weight equal to 200, 400 and 600 are commercially available from Polyscience, preferably POE 400 Aldrich No. 30541-3.

The stearate segments have excellent lubricating properties and their hydrocarbon chains are inert towards lithium; in this case, the bond Y is ensured by the carboxylic group of the starting fatty acid. The terminal group C then consists of a segment Y'-L' identical to L-Y.

It has been observed that a central polyether chain, of low molecular weight, distearate POE 200, is sufficient to give to the lubricating compounds an ionic conductivity of the order to $1 \times 10^{-5}$ S.cm at ambient temperature when a lithium salt such as $Li(CF_3SO_2)_2NLi$ is, added in a ratio such that the ratio O/Li is 30/1. This value is amply sufficient to ensure ionic exchanges at the lithium/electrolyte interface of an electrochemical cell taking into account the small thickness of the residual deposit of the lubricating agent after lamination.

These preferred formulations are given by way of example of possible embodiments of the invention. Other lubricating and solvating functions L and S may be used as well as other bonds Y. By way of non limiting example, reference may be made to the following articles which deal with types of solvating chains:

Polymer Electrolytes review-1, J. R. MacCallum & C. A. Vincent eds. Elsevier Applied Science London (1987);
Polymer Electrolyte, review 2, J. R. MacCallum & C. A. Vincent eds. Elsevier Applied Science London (1989);
Solid Polymer Electrolytes, F. M. Gray VCH Publisher New-York, Weinheim (1991); as well as
Surface Active Ethylene Oxide Adducts, by V. Schoenfeldt-Permagon Press, (1966).

The preparation of the additives according to the present invention is well known to one skilled in the art and needs no detailed discussion in the present context. It is sufficient to mention that any skilled chemist would have no problem to synthesize the desired additive once the solvating and lubricating chains are established and the choice of the chemical bond which is intended to be used has been made.

During lamination, it is generally preferable to dilute the lubricanting agents according to the invention in one or more solvents which are compatible with lithium and which are preferably linear, saturated or partially unsaturated, or cyclic aromatic hydrocarbons such as heptane, benzene, toluene, cyclohexane or any other pre-dehydrated aprotic organic solvent or a mixture thereof. This dilution enables to reduce to a minimum the required quantity of lubricant and to obtain optimum qualities of lithium for use in an electrochemical cell. These solvents are previously dehydrated, for example on a molecular sieve, to lower the water content below 100 ppm. The concentrations of additives may vary up to about 10% by weight for example between 0.01 and 10% by weight, preferably 0.2% by weight. The addition of the lubricanting agent in solution is carried out in a controlled manner immediately before lamination between rollers. The laminated film is dried by a continuous operation with dry air immediately at the outlet of the rollers and is thereafter wound with or without a separator film of inert plastic, preferably of propylene or polyethylene.

BRIEF DESCRIPTION OF DRAWINGS

The invention will be better understood by the annexed drawings given by way of illustration but without limitation, in which:

the single FIGURE is a schematic illustration of a laminating operation utilizing an additive according to the present invention.

DESCRIPTION OF PREFERRED EMBODIMENTS

It will be seen that a lithium sheet 1 having a thickness of about 250 micrometers mounted on an unwinding drum (not illustrated) is passed between two working rollers 3 and 5 made of polyacetal. A pressure is applied on the two rollers in the direction indicated by arrows 7 and 9, which is sufficient to reduce the thickness of the sheet by about 90%. At the inlet of the sheet between the laminating rollers, a lamination lubricant 11 is poured, for example toluene, from a pouring spout 13.

At the outlet of the two lamination rolls, the sheet of lithium is converted into a film 15 whose thickness is about 25 micrometers. On the other hand, it will be realized that the film 15 remains in adhesion on the surface of the roll 3 from the meeting point 17 between the two rollers 3 and 5, up to a given limit point 19 on the circumference of the roller 3 forming an angle α of about 90° with the meeting point 17.

Film 15 is thereafter wound onto a winding drum (not illustrated) with sufficient tension, determined empirically for, on the one hand, causing the film 15 to move from point 19 to be gradually brought to point 21 where the operation is continued without any other change.

Normally, at point 21, the angle β formed will be about 45°, it being understood that this angle may vary depending on circumstances and the desired properties of the film of lithium 15.

An advantageous way to carry out the invention is described in the patent application filed simultaneously herewith and directed to a process of lamination in a single pass, between two rollers of hard plastic. This procedure which is preferably carried out in a single pass relies on the control of the adhesion on one of the plastic rollers so as to pull the lithium according to a preferred angle and to control its inherent flatness.

Other processes of lamination utilizing metallic rollers are also possible while using these additives. Thus, the metallic rollers could be pre-coated with lubricant so as to minimize the adhesiveness. However, the concentration as well as the chemical nature of the additives according to the present invention should be adjusted as a function of the intended production speeds.

These additives are also applicable to the lamination of lithium enriched alloys such as lithium-boron or lithium-magnesium alloys or also to the lamination of other alkali metals, for example sodium and sodium-lead alloys.

The process, the compositions and the additives according to the present invention are also applicable to the preparation of lithium anodes which are used in liquid electrolyte cells as long as the residual film is conductive or soluble in the electrolyte. Similarly, the process and the additives according to the present invention may be used to chemically prepared anodes of lithium alloys or based on carbon-lithium.

Advantageously but without limitation, it is possible to use as additive according to the invention the following chemical products:

Polyoxyethylene distearates in which the solvating segment has a molecular weight (mol. st.) equivalent to 200, 400 and 600, for example distearate 400 of Aldrich No. 30541-3.

Non-ionic surfactants: BRIJ® of ICI America available at Aldrich under catalogue Nos:
  85,836-6 BRIJ® 35
  23,599-7 BRIJ® 58
  23,600-4 BRIJ® 78
  23,865-1 IGEPAL® CO-720
  23,869-4 IGEPAL® DM-970
  Other possible products are illustrated by:
  Distearates (dilaurates, dipalmitates, dioleates)
  of POE (200, 4000 mol. wt.)
  of polypropylene glycol (725, 1000, 2000, 3000)
  of PLURONIC® (OE-OP blocks)
  of polyoxytetramethylene (poly THF) (650, 1000, 2000).
  Dihexadecyl ethers of POE (200–4000 mol. weight).
  Dicholesteryl carbonates of POE (200–4000).
  Tristearates (laurates, palmitates, oleates) of POE, triol (200, 4000) (DKS).
  Monostearates (laurates, palmitates, oleates)
  of BRIJ (35, 58, 78)
  of IGEPAL (CO-720, DM-970).
  The polymethacrylates of oligo-oxyethylene-monolaurylether.

It is often preferable to use solvents which are compatible with lithium for diluting the lubricating additive. The latter are preferably linear hydrocarbons. The concentrations of the additives may then vary between 10 to 20% P/P and less than 0.05% P/P.

The lithium produced by utilizing the additives according to the present invention may be used as such in polymer electrolyte cells. Canadian patent application No. 2,068, 290-6 filed on May 8, 1992 describes one way of producing a complete cell and various ways of establishing electrical contacts on the lithium sheet. In these cases, the lamination additive will be made electrolytically conductive by the diffusion of the salt of lithium from the film of electrolyte of the cell.

In certain cases, the residual layer remaining after lubrication may be more or less dissolved or dispersed in the electrolyte, for example when the latter is of low molecular weight or comprises liquid aprotic solvents.

Other characteristics and advantages of the present invention will appear from the description which follow of embodiments given by way of illustration but without limitation.

EXAMPLE 1

In this example, the determining effect of a preferred additive according to the invention on a lamination carried out during a continuous operation and in a single pass to give a lithium film less than 30 micrometers ($\mu$), is established. The device used is the one described in FIG. 1 and the lamination is carried out in an anhydride atmosphere containing less than 1% relative humidity. The rollers are made of polyacetal and have a diameter of 20 mm; the starting lithium consists of an extruded sheet 250 micrometers ($\mu$) thick. The solvents and the additive, if needed, are previously dehydrated on a molecular sieve in order to give a water concentration lower than 10 ppm.

As a first step, an attempt is made for laminating in a continuous operation a sheet of lithium 57 mm wide and to reduce its thickness in a single pass to $25\mu$. When no lubricating liquid is used during the lamination, lithium immediately adheres to the rollers and the process does not operate properly; with the addition of hexane, it is impossible to achieve lamination unless the rate of reduction of the thickness of the sheet is considerably reduced. At the best, we managed to obtain a lithium $90\mu$ in a single pass in which the inherent flatness of the film is extremely bad. Therefore, hexane, as used in the prior art, does not possess sufficient lubricating properties to be used alone in a continuous process in a single pass to give a lithium less than $25\mu$.

When the lamination is carried out with a lubricating liquid consisting of toluene, added at the rate of 8 ml/min. on a extruded sheet 57 mm wide, the lamination of lithium in a continuous operation to $25\mu$ becomes possible and a maximum speed of 5 m/min. is obtained while allowing the laminated film to adhere to the upper roller up to a quarter of its height (angle of 45°), as illustrated in FIG. 1 of the Canadian patent application mentioned above. This operation enables to perfectly control the tension applied on the free film and gives a lithium of excellent inherent flatness. Lengths of 10 to 20 meters may thus be obtained in continuous operation. By rapidly changing from toluene to hexane during the operation, there is produced an instantaneous rise in the thickness of the lithium to about $90\mu$ and a lithium of very bad inherent flatness is obtained.

The interest of the additives according to the invention is established by utilizing an extruded lithium $250\mu$ of 143 mm wide. The device of the previous tests was used with a solution of hexane and toluene in a ratio 9:1 containing a distearate POE 200 (mol. weight) at a concentration of 0.2% P/P. An excess of lubricating solution is added on the sheet of extruded lithium at the rate of 6 ml/min. Under these conditions, a lithium film $22\mu$ of excellent inherent flatness is obtained in a single pass at a lamination speed of more than 20 m/min. This process which is still not optimum additionally enables to produce rolls of laminated sheets more than 300 meters long in which the thickness is constant at more or less $2\mu$. The following productions are highly reproducible from one test to the other and the rates of losses or interruptions of the process are negligible; more important productions are thus possible starting from longer rolls of extruded lithium or from a feed to the laminating rolls, directly from an extruder.

EXAMPLE 2

Lithium $22\mu$ produced by utilizing the additive of example 1 is used as the anode of a lithium cell operating at 60° C. The visual aspect of lithium is excellent, the lithium is bright without any coloring, and the surface profile obtained with DEKTAK® (model 3030 of VEECO U.S.A.)

fluctuates within 3μ. For this laboratory test, the lithium sheet is lightly applied under pressure on a thin nickel sheet to ensure current collection. The electrolyte used consists of a polymer electrolyte consisting of a copolymer of ethylene oxide and methylglycidyl ether and a lithium salt, $(CF_3SO_2)_2NLi$ in an oxygen lithium ratio (O/Li) of 30/1. The composite cathode consists of vanadium oxide and carbon black dispersed in the polymer electrolyte and has a capacity of 5 C/cm². The active surface of the battery thus constituted is 3.9 cm². The initial impedance of this battery at 60° C. is 15 Ω, i.e. it is equivalent to or lower than the best lithium obtained commercially. The cycling properties of this battery utilizing the lithium of example 1 are excellent after 100 cycles and the rate of utilization of the battery remains at least equivalent to similar batteries prepared with commercial lithium, or about 90% of the initial value stabilized after 10 cycles. This example confirms that the presence of the non volatile distearate of POE which remains at the surface of lithium causes no harm to the good operation of the cell. This result is explained by the electrolytic conductivity generated by the presence of the POE solvating segment of the additive and by the chemical compatibility of the battery with lithium. In an independent test, the electrolytic conductivity of this additive, when the salt content $(CF_3SO_2)_2NLi$ is 30/1, is about $1 \times 10^{-5}$ S.cm.

EXAMPLE 3

In this example, we have evaluated at a temperature of 25° C. the impedance of symmetrical batteries Li°/polymer electrolyte/Li° prepared from laminated lithium without additive and also when covered with an excess of various possible lubricating materials.

The quantity of lubricating agent used per surface unit of lithium is 0.03 mg/cm². This value corresponds to an excess of lubricating agent as compared to what is necessary for laminating according to example 1, however the aimed purpose is to amplify and accelerate the electrochemical effect of various additives. The impedance values are given for batteries whose active surface is 3.9 cm². The electrolyte of example 1 is also used to prepare batteries which are assembled by hot pressing under vacuum.

For the various material used, the results are the following:

|   | Impedance |
|---|---|
| 1) Distearate of POE 200 (mol. Wt.) | 113Ω |
| 2) Distearate of POE 600 (mol. Wt.) | 113Ω |
| 3) Pure stearic acid | 840Ω |
| 4) Pure POE of molecular wt. 500 | 139Ω |

The values observed confirm the influence of the POE segment on the electrolytic conductivity of the additives and enable to conclude that stearic acid often used as lubricating agent for laminating conventional metals is incompatible with lithium for use in an electrochemical cell.

EXAMPLE 4

In this example a comparison is made of the effect of various known lamination additives for their lubricating properties on the efficiency of lamination of lithium in a single pass from 250μ to about 30μ.

In order to make these comparisons, the lamination is initiated under conditions similar to those of example 1 by utilizing distearate of POE 200 as additive. When the lamination is in operation, the composition of the solution is modified by replacing the distearate POE with other additives. The effect of the addition is immediately noted by following the thickness of the laminated lithium film, its inherent flatness and its visual appearance. When the solution containing the distearate is replaced by a solution of ethyl stearate at a concentration of 0.15% P/P, the thickness of lithium rises suddenly from 40 to 90μ and with a loss of inherent flatness of the laminated lithium.

When changing to a laminating solution based on the lamination lubricant EPAL® 1012 (CO linear alcohol) of Ethyl Corporation, it is noted that the thickness of laminated lithium progressively rises beyond 65μ and that the lithium obtained become sticky at the center of the rollers while the sides become irregular (undulations).

When changing to a laminating solution based on POE 5000 in toluene, a rapid rise of the thickness of laminated lithium to 90μ with a loss of inherent flatness is noted.

These tests illustrate the importance of formulations based on stearates which act as lubricating agents and include solvating functions such as those based on POE. These preferred but non-limiting formulations are also superior to additives based on pure POE in terms of lamination process even if the electrolytic conductive properties are in this case adequate as illustrated in example 3.

EXAMPLE 5

In this example, the POE stearate is replaced by other compounds of the invention while preserving the other identical conditions. The two compounds used are: dicholesteryl-carbonate of POE 600 (mol. Wt.) and dipalmitate of POE 4000.

In the two cases, the lamination speed may be maintained and the thickness of the laminated lithium is substantially the same. In these two cases, the inherent flatness of lithium is preserved. These examples confirm the generality of the formulations which combine the solvating and lubricating functions.

EXAMPLE 6

This example describes a compound according to the invention which includes the ionophoritic group according to formula L-Y-S-C (where C comprises a dissociable metal salt enabling the additive L-Y-S-C to have an intrinsic ionic conductivity). This type of compound is important as lamination additive when the laminated lithium is intended to be used for example in cells in which the electrolyte include a salt whose anion is chemically bounded to the polymeric chain. In this case, there is no possibility for the salt of lithium to diffuse and the lubricating additive should include an ionophoretic function to prevent the formation of an insulating deposit at the surface of lithium.

A non-ionic tensio-active agent of the type BRIJ 35®, polyoxyethylene 23 lauryl ether $C_{12}H_{25}(OCH_2CH_2)_{23}OH$ is sulphonated by the following procedure: 12 g of BRIJ 35® are dried by azeotropic distillation with benzene followed by lyophilisation. After addition of 50 ml of THF, the terminal OH groups are metallized with sodium hydride in the presence of 5 mg of triphenylmethane. The stoichiometry is determined by colorimetry, the end of the reaction being indicated by the intense red colour of the $\Phi_3C$ anion. 1.4 g of 1,4 butane sulphone are then added. After evaporation of the solvent, the sulphonated oligomer is obtained in the form of powder. 5 g of the product thus formed in suspension in 15 ml of acetonitrile are treated with 1 ml of thionyl chloride and 20 μl of dimethylformamide. A precipitate of sodium chloride is formed in 20 mn. After filtration, the solvent and the excess of $SOC_2$ are evaporated under reduced pressure. The residue is solubilized in 30 ml of pyridine and added to 1.2 g of the sodium salt of bis(trifluoromethanesulfonyl) methane. After filtration, the reaction mixture is stirred in the presence of 1 g of lithium phosphate $Li_3PO_4$. A new filtration enables to separate a colourless solution which, by concentration, gives a wax. This material possesses tension active properties of lubrication and ionic conduction.

When used under the conditions of Examples 1 and 5, this material also enables the lamination of lithium under equivalent conditions. This example is non-limiting and other equivalent materials including a more or less dissociable ionic function may also be used.

EXAMPLE 7

An extruded sheet of lithium 1 250 micrometers thick and 143 mm wide is used as starting material. The latter is mounted on an unwinding drum, passed between working rollers and the film is rolled onto a winding drum. A pressure which is sufficient to thin down the film is applied on the working rollers. These rollers are of polyacetal and have a diameter of 20 mm. The film is mounted on the apparatus between the working rollers. The pressure on the rollers is increased in order to decrease the thickness of the film by about 90%. A lubricating agent is added on the film of lithium at a rate of 6 ml/min. This lubricating agent is made of a mixture of solvents to which there is added a lamination additive, which comprises dry hexane and toluene in a ratio of 9:1 and 0.2% p/p POE 200 distearate of formula $CH_3$—$(CH_2)_{16}$—COO—$(CH_2$—$CH_2O)_n$—OOC$(CH_2)_{16}$—$CH_3$ where n is selected so that the polyether segment has a molecular weight of 200.

The film is allowed to adhere to x¼ of the height of the working roller so as to perfectly control the tension applied on the latter. The pressure which is exerted on the rollers is adjusted so as to obtain in a single pass a film of lithium 25 micrometers thick, homogeneous at ±2 µm and 300 meters long. It will therefore be seen that it is possible to operate in a continuous manner without reject.

This additive enables to raise the speed of lamination to 20 m/min and to obtain a thin film of lithium of excellent quality.

We claim:

1. A sheet of an alkaline metal or an alloy thereof having a layer of non-volatile additive thereon, essentially constituting a lubricating agent therefor, said sheet to be used in an electrochemical cell operating with a polymer electrolyte while said layer remains between said sheet and said polymer electrolyte, wherein said additive has the formula:

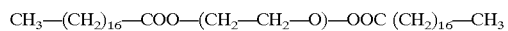

wherein n ranges from 3–100.

2. The sheet of claim 1, wherein said additive is a distearate of polyoxyethylene, the polyoxyethylene portion of the distearate additive having a weight between 150 and 4,000.

* * * * *

UNITED STATES PATENT AND TRADEMARK OFFICE
CERTIFICATE OF CORRECTION

PATENT NO. : 5,837,401
DATED : November 17, 1998
INVENTOR(S) : Michel Armand et al.

It is certified that error appears in the above-identified patent and that said Letters Patent is hereby corrected as shown below:

Column 12,
Line 22, "$CH_3—(CH_2)_{16}—COO—(CH_2—CH_2—O)—OOC\ (CH_2)_{16}—CH_3$";
should read -- $CH_3—(CH_2)_{16}—COO—(CH_2—CH_2—O)_n—OOC\ (CH_2)_{16}—CH_3$ --

Signed and Sealed this

Thirtieth Day of July, 2002

*Attest:*

JAMES E. ROGAN
*Attesting Officer*         *Director of the United States Patent and Trademark Office*